UNITED STATES PATENT OFFICE.

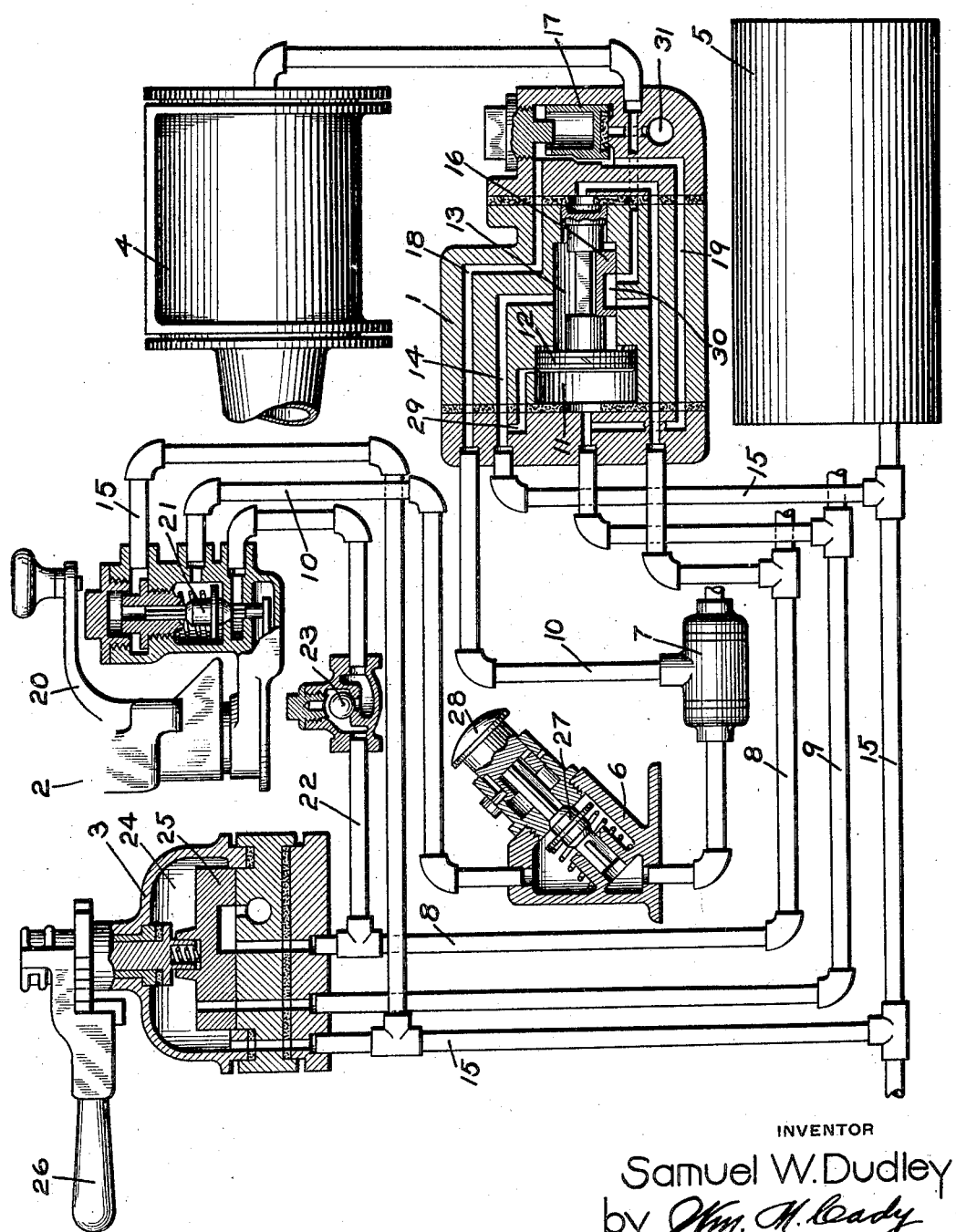

SAMUEL W. DUDLEY, OF EDGEWOOD, PENNSYLVANIA, ASSIGNOR TO THE WESTING-HOUSE AIR BRAKE COMPANY, OF WILMERDING, PENNSYLVANIA, A CORPORATION OF PENNSYLVANIA.

SAFETY CAR-CONTROL DEVICE.

1,400,669.  Specification of Letters Patent.  Patented Dec. 20, 1921.

Application filed February 5, 1919. Serial No. 275,231.

*To all whom it may concern:*

Be it known that I, SAMUEL W. DUDLEY, a citizen of the United States, residing at Edgewood, in the county of Allegheny and State of Pennsylvania, have invented new and useful Improvements in Safety Car-Control Devices, of which the following is a specification.

This invention relates to fluid pressure brakes, and more particularly to a safety car control equipment in which the brakes are applied upon removal of the hand from the electric controller handle.

With an equipment of the above character, it has heretofore been proposed to normally control the brakes in service by straight air and it will be evident that if the brakes are applied by straight air, it is not necessary or advisable for the brakes to be applied in emergency upon removal of the operator's hand from the controller handle.

The principal object of my invention is to provide improved means for preventing an emergency application of the brakes upon removal of the operator's hand from the controller handle, when a straight air application of the brakes is made.

In the accompanying drawing, the single figure is a diagrammatic view, with the principal parts in section, of a safety car control equipment embodying my invention.

As shown in the drawing, the equipment may comprise an emergency valve device for controlling the application and release of the brakes, a safety controller handle device 2, a brake valve device 3, a brake cylinder 4, a main reservoir 5, a foot valve device 6, a double check valve 7, a straight air pipe 8, an emergency brake pipe 9, and a safety control pipe 10.

The emergency valve device 1 may comprise a casing having a piston chamber 11, connected to emergency brake pipe 9 and containing piston 12, and a valve chamber 13, connected by passage 14 to the main reservoir pipe 15 and containing a slide valve 16.

Included in the emergency valve device 1 is a relay valve 17, having one side connected by passage 18 to the safety control pipe 10 and having the outer area of the opposite side connected by passage 19 to the emergency brake pipe 9.

The safety controller handle device 2 may comprise a handle 20 adapted to operate a double beat pilot valve 21, so that when the handle is depressed, communication is closed from the safety control pipe to a branch pipe 22, connected to straight air pipe 8 and containing a check valve 23, while communication is opened from main reservoir pipe 15 to the safety control pipe 10.

The brake valve device 3 may comprise a casing, having a valve chamber 24 containing a rotary valve 25 adapted to be operated by handle 26.

The foot valve device 6 comprises a casing containing a double beat valve 27 adapted to be operated by pedal 28 and adapted, when the pedal is depressed, to cut off communication through the safety control pipe 10.

In operation, the emergency brake pipe 9 is maintained normally charged with fluid under pressure either through the brake valve or from the main reservoir, through passage 29, when the emergency piston 12 is in release position.

The safety control pipe 10 and the chamber above the relay valve 17 are normally charged with fluid under pressure, when the controller handle 20 is held depressed, from the main reservoir pipe 15, past the double beat pilot valve 21.

By manipulation of the brake valve handle 26, fluid under pressure may be supplied to and released from the straight air pipe 8, so as to supply and release air to and from the brake cylinder 4, through cavity 30 in slide valve 16.

If the controller handle is released by the removal of the operator's hand, the double beat valve 21 is operated to cut off communication from the main reservoir pipe 15 to the safety control pipe 10 and open communication from the control pipe to pipe 22.

It is not deemed necessary to more fully show and describe the construction referred to in the last paragraph, since the same is fully disclosed in the prior patent of Walter V. Turner, No. 1,265,006, dated May 7, 1918.

According to my invention, if the brakes have not been applied by making a straight air application of the brakes, then fluid will be vented from the safety control pipe 10 to the straight air pipe 8 and the relay valve 17 will then be operated by the emergency brake pipe pressure acting below the valve, so as to open same and vent fluid from the emergency brake pipe to exhaust port 31. The emergency piston 12 thereupon operates the valve 16, so as to open communication for supplying fluid from the valve chamber 13 and the main reservoir, directly to the brake cylinder, to effect an emergency application of the brakes.

If, however, a straight air application of the brakes has been made and the controller handle 20 is released, while communication is opened from control pipe 10 to pipe 22, fluid will not be vented from the control pipe, since the straight air pressure in pipe 8 will prevent any venting of air.

It will thus be seen that if the operator first makes a straight air application of the brakes, he may remove his hand from the controller handle without causing an emergency application of the brakes.

The operator may also prevent the operation of the safety controller handle device to effect an emergency application of the brakes, without first making a straight air application of the brakes, if he depresses the pedal 28. In which case, the valve 27 is operated to cut off communication through the safety control pipe 10 to the pilot valve, so that the opening of the pilot valve 21 by the release of the controller handle will not be effective to vent fluid from the relay valve 17.

The last described arrangement is desirable in case the operator wishes the use of his hands to make change and the like, while the car is running, and it is not desired to effect an application of the brakes.

The check valve 23 is interposed in the branch pipe 22, so as to prevent back flow from the straight air pipe 8 and possible leakage, when a straight air application of the brakes is made, from the pipe 22, past the stem of the pilot valve 21.

Having now described my invention, what I claim as new, and desire to secure by Letters Patent, is:—

1. In a safety car control equipment, the combination with a straight air pipe normally at atmospheric pressure, of means adapted to vent fluid under pressure to the straight air pipe for effecting an emergency application of the brakes.

2. In a safety car control equipment, the combination with a brake cylinder and a straight air pipe normally open to the atmosphere and through which fluid under pressure is supplied to and released from the brake cylinder, of a device operated upon a reduction in fluid pressure thereon for effecting an application of the brakes and means for venting fluid from said device to the straight air pipe.

3. In a safety car control equipment, the combination with a brake cylinder and a straight air pipe through which fluid under pressure is supplied to the brake cylinder, of a relay valve operated upon a reduction in fluid pressure thereon for effecting an emergency application of the brakes, a controller handle, and a pilot valve operated upon release of the controller handle for opening communication from the relay valve to the straight air pipe.

4. In a safety car control equipment, the combination with an emergency brake pipe, a straight air pipe, and a relay valve operated upon a reduction in pressure for venting fluid from the emergency brake pipe to effect an emergency application of the brakes, of a controller handle and a pilot valve operated upon release of the controller handle for venting fluid from said relay valve to the straight air pipe.

5. In a safety car control equipment, the combination with a straight air pipe, of a valve operated upon a reduction in fluid pressure for effecting an application of the brakes, means for venting fluid from said valve to the straight air pipe, and a check valve for preventing back flow from the straight air pipe to said valve.

In testimony whereof I have hereunto set my hand.

SAMUEL W. DUDLEY.